United States Patent
Tsai et al.

(10) Patent No.: US 8,212,938 B2
(45) Date of Patent: Jul. 3, 2012

(54) SYNC SIGNAL ACQUISITION DEVICE

(75) Inventors: Jui-Yuan Tsai, Tainan (TW); Szu-Ping Chen, Chu Pei (TW); Yu-Pin Chou, Tung Hsiao Town (TW)

(73) Assignee: Realtek Semiconductor Corp., Hsinchu (TW)

( * ) Notice: Subject to any disclaimer, the term of this patent is extended or adjusted under 35 U.S.C. 154(b) by 1284 days.

(21) Appl. No.: 11/822,392

(22) Filed: Jul. 5, 2007

(65) Prior Publication Data

US 2008/0007656 A1    Jan. 10, 2008

(30) Foreign Application Priority Data

Jul. 7, 2006  (TW) ................................ 95124743 A

(51) Int. Cl.
*H04N 9/72*    (2006.01)
(52) U.S. Cl. ........................................................ 348/692
(58) Field of Classification Search .......... 348/500–551, 348/689, 691–697, 705–706; 345/94, 98, 345/204
See application file for complete search history.

(56) References Cited

U.S. PATENT DOCUMENTS 5,436,667 A     7/1995 Lagoni
5,760,844 A *  6/1998 Jorden ........................... 348/691

FOREIGN PATENT DOCUMENTS

CN          1085716 A     4/1994

OTHER PUBLICATIONS

Analog Devices—AD9887, "Dual Interface for Flat Panel Displays," pp. 1-56, Jun. 25, 2001.
Analog Devices—AD9883A, "110 MSPS/140 MSPS Analog Interface for Flat Displays," pp. 1-24, 2001.

* cited by examiner

*Primary Examiner* — Dominic D Saltarelli
*Assistant Examiner* — Alfonso Castro
(74) *Attorney, Agent, or Firm* — Muncy, Geissler, Olds & Lowe, PLLC

(57) ABSTRACT

A sync signal acquisition device is disclosed which comprises a transistor, a resistor, a clamper, an analog multiplexer and a comparator. While operating in a composite HS mode, prior to the generation of the sync signal HS, the invention uses a conventional circuit to extract a composite sync signal at start-up, thereby allowing related circuits to generate the sync signal HS and a clamping signal. Then, a mode selecting signal is used to disable the automatic clamping mode and switch the analog multiplexer to a forced clamping mode. At this point, the output voltage of the damper is set by a user instead of process; accordingly, the DC voltage level is more controllable, but not subject to drift due to process changes or temperature changes.

27 Claims, 6 Drawing Sheets

SYNC SIGNAL ACQUISITION DEVICE

BACKGROUND OF THE INVENTION

1. Field of the Invention

The invention relates to a display system, and more particularly, to a sync signal acquisition device so as to minimize a DC level drift due to process changes or temperature changes of either a Sync_on_Geen (SOG) circuit or a Sync_on_Luma (SOY) circuit.

2. Description of the Related Art

Conventionally, an analog front end device includes a SOG circuit, which extracts a composite sync signal based on a SOG signal, wherein the composite sync signal contains a horizontal sync (HS) signal and a vertical sync (VS) signal.

FIG. 1 is a schematic circuit diagram of a conventional SOG circuit. FIG. 2A is a waveform diagram of a SOG signal. FIG. 2B shows waveform diagrams of a SOG signal with its DC voltage level reconstructed, a composite sync signal HS+VS and a clamping signal CP.

Referring to FIG. 1, a SOG circuit 100 comprises a NMOS transistor 110, a resistor 120 and a comparator 130. A capacitor 140, usually installed in front of a node A in the SOG circuit 100, is configured to get rid of a DC voltage level of the SOG signal. The purpose of installing the SOG circuit 100 is to extract sync pulses from the SOG signal, i.e., extracting the negative pulse (or peak) depicted in FIG. 2A. An example of the simplest implementation is using a comparator. The voltage of the SOG signal may have positive and negative polarities (e.g., the voltage of the SOG signal ranging from −300 mV to 750 mV as shown in FIG. 2A), so the DC voltage level of an original SOG signal needs to be shifted before comparing with a comparing voltage VB2 by using the comparator 130. In other words, the entire voltage range of the SOG signal in this illustration is required to be equal to or greater than zero before comparison. Take FIG. 2B for example. The voltage of an original SOG signal ranges from −300 mV to 750 mV while the reconstructed voltage of the SOG signal ranges from 0V to 1.05V. At this moment, if the comparing voltage VB2 is set to a range of 0~300 mV, then the composite sync signal HS+VS will be obtained easily. Wherein, a gate of the transistor 110 is coupled to a predetermined voltage VB1 (e.g., 0.5V), causing the transistor 110 to switch on as soon as a negative pulse of the SOG signal arrives. Accordingly, the potential of the node A is increasing, resulting in a rising potential of the composite sync signal HS+VS. Conversely, the transistor 110 is switched off while a non-negative voltage level of the SOG signal arrives at the SOG circuit 100. At this moment, the potential of the node A is going down due to a discharging voltage drop of the resistor 120, resulting in a falling potential of the composite sync signal HS+VS. The DC voltage level of the node A is finally settled after the balance of charging and discharging among the transistor 110, the capacitor 140 and the resistor 120. Therefore, the clamping mode in which the SOG circuit 100 operates is often called an "automatic clamping mode".

In general, the interior of an integrated circuit is divided into a digital circuit and an analog circuit. Normally, there is no thermal drift in the digital circuit. By contrast, there is a thermal drift in the analog circuit. For example, there is process drift among integrated circuits, so its voltage varies according to the temperature and its frequency also varies according to the temperature. In applications of display system controllers (including the LCD controllers and the video decoders as mentioned above), users would like the display system to have the same characteristic both at start-up (usually at a lower temperature) and after warm-up (usually at a higher temperature), e.g., a consistent display color and a consistent optimum sampling phase of an analog to digital converter (ADC). It implies that the thermal drift is not allowed to occur in clampers, ADCs, a sync processor with clock generator, the SOG circuit, the SOY circuit and related circuits. Although the SOG circuit 100 is featured in a simple structure, a small size and low cost, the DC voltage level measured at the node A is not controlled easily and subject to drift due to process and temperature changes. This causes the reconstructed DC voltage level of the SOG signal to move vertically, resulting in a horizontally shifting composite sync signal HS+VS.

SUMMARY OF THE INVENTION

In view of the above-mentioned problems, an object of the invention is to provide a sync signal acquisition device in order to eliminate a thermal drift in a display system due to process changes or temperature changes.

To achieve the above-mentioned object, the sync signal acquisition device of the invention, comprising a transistor, a resistor, a clamper, an analog multiplexer and a comparator, receives an analog image signal containing sync pulses and generates a composite sync signal. One terminal of the transistor is coupled to a predetermined voltage and another terminal of the transistor, designated as a first input node, receives the analog image signal containing sync pulses. One terminal of the resistor is coupled to the first input node while the other terminal of the resistor is coupled to a fixed voltage (e.g., ground). The clamper is configured to reconstruct the DC voltage level of the analog image signal and its output terminal is designated as a second input node. The analog multiplexer receives voltages of the two input nodes and outputs the voltage of either input node according to a mode selecting signal. The comparator compares an output voltage of the analog multiplexer with a comparing voltage to generate the composite sync signal, wherein the analog multiplexer outputs the voltage of the first input node at start-up.

In an illustrative embodiment, the clamper is implemented by a switch coupled to a reconstructed voltage, wherein the operation of the switch is controlled by a clamping signal.

Another object of the invention is to provide an analog front end (AFE) device, which is configured to receive both an analog image signal containing sync pulses and two analog image signals without embedded sync pulses and generate three digital signals. The AFE device comprises a bandgap voltage reference circuit, a sync processor with clock generator, three identical converting circuits and a sync signal acquisition device. The bandgap voltage reference circuit is employed to provide a reference voltage while the sync signal acquisition device is employed to receive the analog image signal containing sync pulses and generate the composite sync signal. After receiving the composite sync signal, the sync processor with clock generator generates a periodic clock signal and a clamping signal. Each of the three converting circuits comprises a clamper, an input buffer and an ADC. The clamper receives the analog image signal and then reconstructs the DC voltage level of the analog image signal to generate a reconstructed signal. The input buffer buffers the reconstructed signal according to reference voltage. The ADC converts the output signal of the input buffer into a digital signal with respect to the clock signal.

Still another object of the invention is to provide a sync signal generating circuit, comprising: a first clamping circuit for providing a first DC voltage level; a second clamping circuit for providing a second DC voltage level; a switching circuit coupled to the first clamping circuit and the second clamping circuit for outputting either the first DC voltage level or the second DC voltage level in response to a control signal; and, a comparator coupled to the switching circuit for receiving either the first DC voltage level or the second DC voltage level and comparing an analog signal with a reference signal to generate a sync signal.

While operating in a composite HS mode, prior to the generation of the sync signal HS, the invention uses a conventional SOG (or SOY) circuit to extract a composite sync signal HS+VS (i.e., the automatic clamping mode) at start-up (usually at a lower temperature), thereby allowing related circuits to generate the sync signal HS and the clamping signal. Afterwards, a mode selecting signal is used to disable the automatic clamping mode and switch the analog multiplexer to a forced clamping mode. At this moment, the output voltage of the clamper is set by a user instead of process; accordingly, the DC voltage level is more controllable, but not subject to drift due to process changes or temperature changes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The sync signal acquisition device of the invention will be described with reference to the accompanying drawings.

Figure 3:
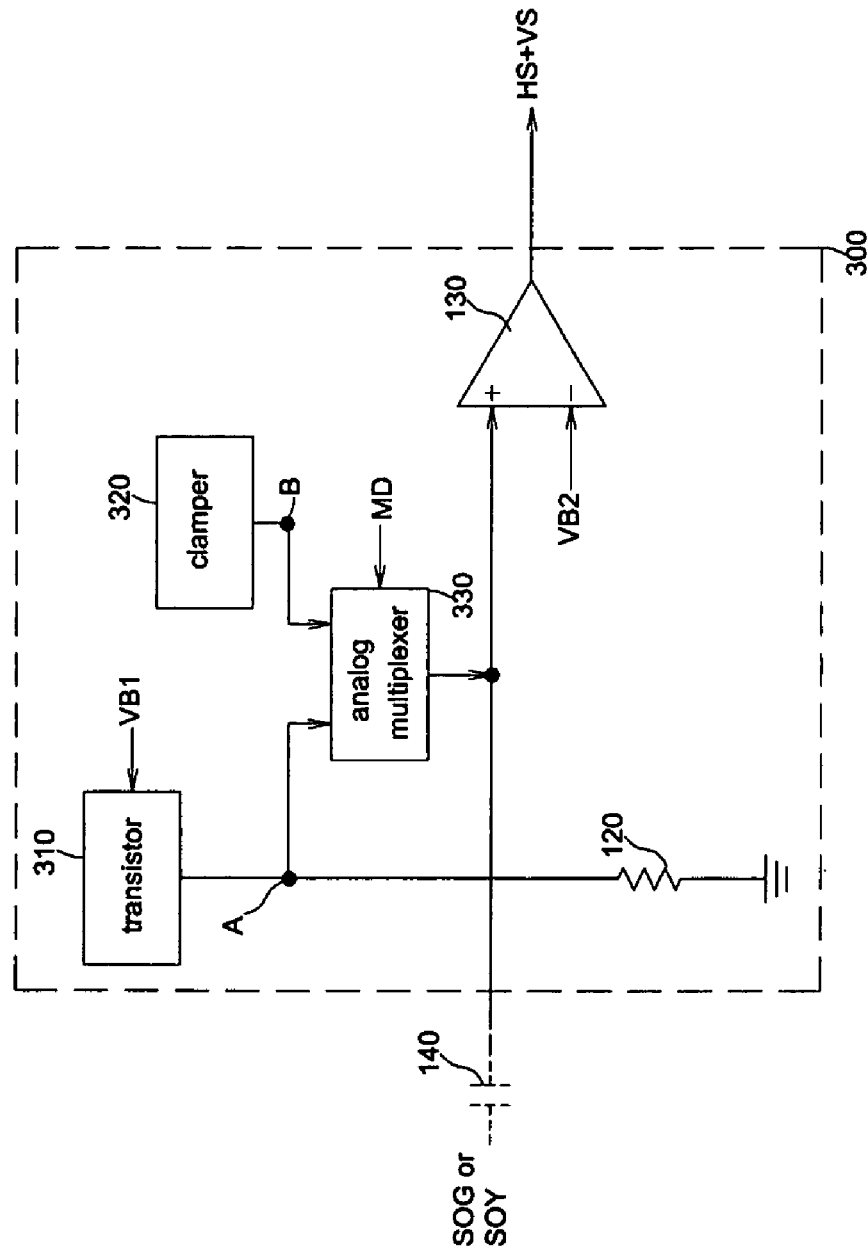
FIG. 3 is a block diagram illustrating a sync signal acquisition device of the invention.

FIG. 3 is a block diagram illustrating a sync signal acquisition device of the invention. According to the invention, a sync signal acquisition device 300 receives an analog image signal containing sync pulses (e.g., a SOG signal or a SOY signal) and generates a composite sync signal HS+VS. The sync signal acquisition device 300 comprises a transistor 310, a resistor 120, a clamper 320, an analog multiplexer 330 and a comparator 130. One terminal of the transistor 310 is coupled to a predetermined voltage VB1 and another terminal of the transistor 310, designated as an input node A, receives the analog image signal containing sync pulses. One terminal of the resistor 120 is coupled to the node A while the other terminal of the resistor 120 is coupled to ground. The clamper 320 is configured to reconstruct the DC voltage level of the analog image signal and its output terminal is designated as an input node B. The analog multiplexer 330 receives voltages of the input nodes A and B and outputs the voltage of either input node according to a mode selecting signal MD. The comparator 130 compares an output voltage of the analog multiplexer 330 with a comparing voltage VB2 to generate the composite sync signal HS+VS, wherein the analog multiplexer 330 outputs the voltage of the node A at start-up.

One feature of the invention is that the clamper 320 is introduced into a conventional SOG (or SOY) circuit for reconstructing the DC voltage level of the SOG (or SOY) signal (hereinafter called the forced clamping mode); besides, the analog multiplexer 330 is switched between two modes, i.e., the automatic clamping mode and the forced clamping mode, by means of a mode selecting signal MD. At start-up, the display system (usually at a lower temperature and relatively stable) initially operates in a composite HS mode and no sync signal HS is generated yet. The DC voltage level of the SOG (or SOY) signal is firstly reconstructed by using the conventional circuit (transistor 310 in series with a resistor 120) and then the composite sync signal HS+VS is extracted by using the comparator 130, thereby allowing a sync processor to generate the sync signals HS, VS and a clamping signal CP. After a period of time has elapsed (the display system at a higher temperature and subject to a thermal drift), the analog multiplexer 330 is switched to the forced clamping mode by using the mode selecting signal MD and the DC voltage level of the SOG (or SOY) signal is then reconstructed based on the stable output voltage of the clamper 320. Since the output voltage of the clamper 320 is set by users instead of process, the DC voltage level of the SOG (or SOY) signal is more controllable, but not subject to drift due to process changes or temperature changes. In this embodiment, as soon as one of predefined conditions (e.g., a period of time having elapsed or the temperature reaching a predefined value) is satisfied, the mode selecting signal MD is generated to switch the analog multiplexer 330, wherein the generation of the mode selecting signal MD is well known to those skilled in the art and thus will not be described herein.

Figure 4:
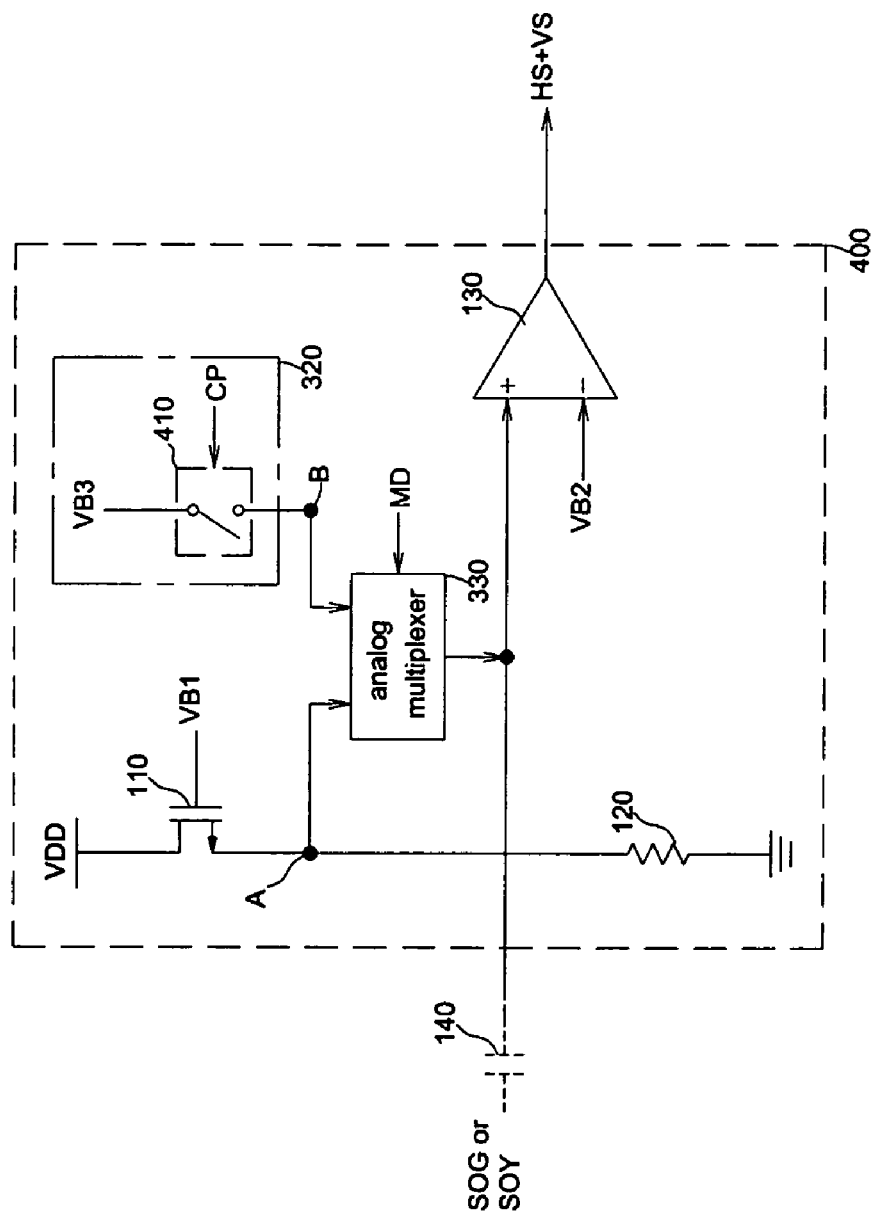
FIG. 4 is a schematic circuit diagram illustrating a sync signal acquisition device according to an embodiment of the invention.

FIG. 4 is a schematic circuit diagram illustrating a sync signal acquisition device according to an embodiment of the invention.

Figure 1:
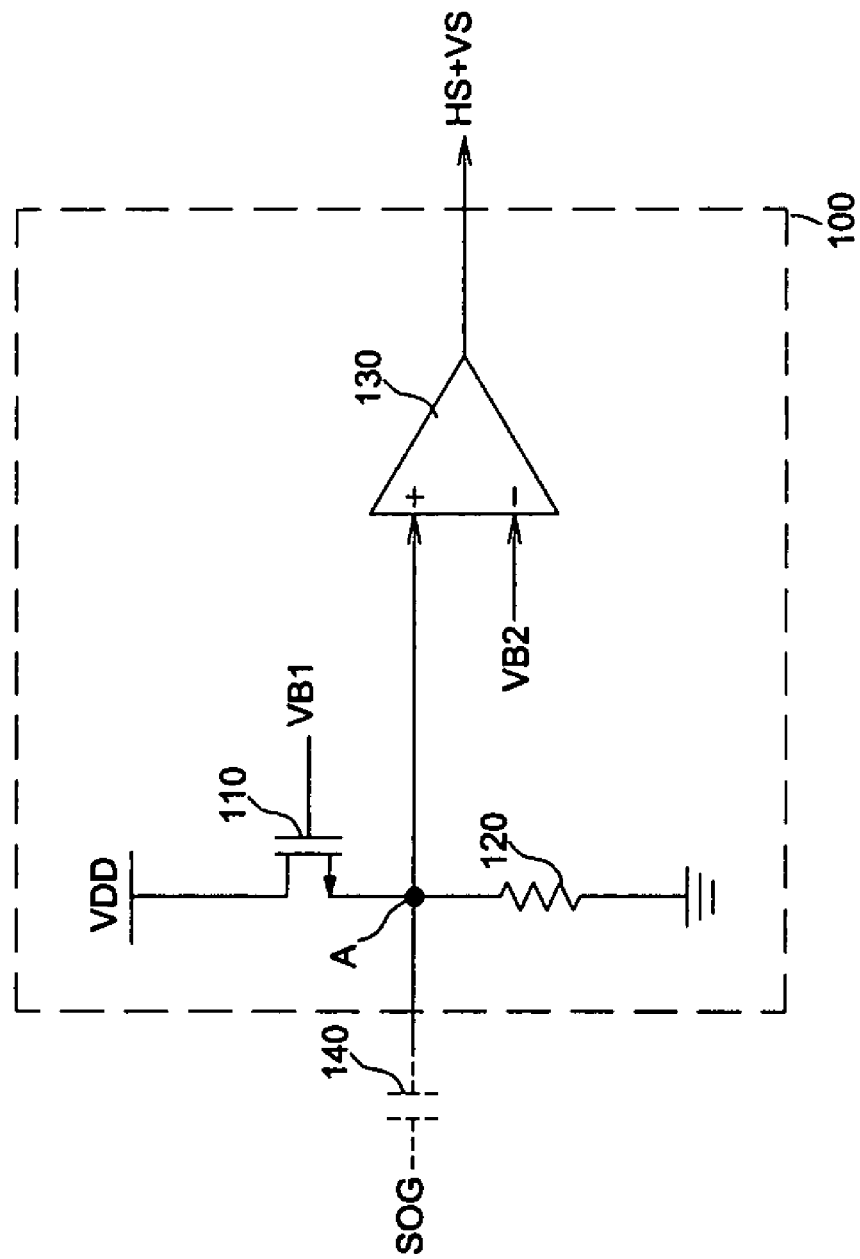
FIG. 1 is a schematic circuit diagram of a conventional SOG circuit.
Figure 2A:
FIG. 2A is a waveform diagram of a SOG signal.
Figure 2B:
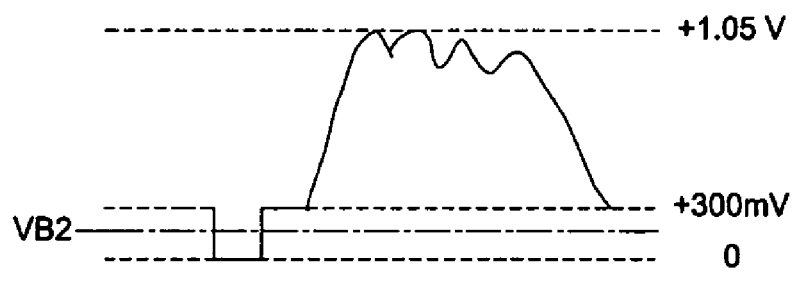
FIG. 2B shows waveform diagrams of a SOG signal with its DC voltage level reconstructed, a composite sync signal HS+VS and a clamping signal CP.
Figure 2B:
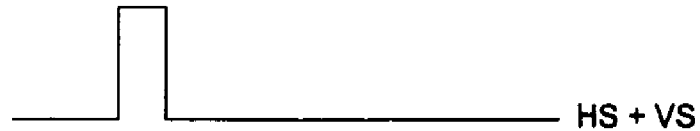
Figure 2B:
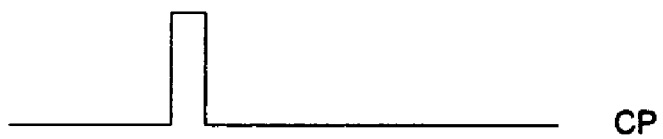

Referring to FIGS. 2B and 4, a sync signal acquisition device 400 comprises a NMOS transistor 110, a resistor 120, a clamper 320, an analog multiplexer 330 and a comparator 130. The clamper 320 is implemented by a switch 410 in connection with a reconstructing voltage VB3, wherein the operation (the ON state or the OFF state) of the switch 410 is controlled by the clamping signal CP (as shown in FIG. 4). Due to the fact that operating voltages and operating currents in the sync signal acquisition device 400 are normally larger than or equal to zero, if the comparator 130 is preferably operable to compare two input voltages, the following two equations are satisfied:

$$(-300\ mV + VB3) < VB2 < VB3$$

$$VB3 \geq 300\ mV,$$

where VB2 denotes the comparing voltage and V3 denotes the reconstructing voltage.

There are at least three embodiments of the transistor 310 of FIG. 3. The first embodiment is implemented by a NMOS transistor 110 with its drain coupled to the power supply voltage VDD, its gate coupled to the predetermined voltage VB1 and its source designated as the input node A shown in FIG. 4. The second embodiment is implemented by a NPN bipolar junction transistor with its collector coupled to the power supply voltage VDD, its base coupled to the predetermined voltage VB1 and its emitter designated as the input node A. The third embodiment is implemented by a PN diode with its anode (p-type side) coupled to the predetermined voltage VB1 and its cathode (n-type side) designated as the input node A. Each of the three embodiments of the transistor 310 needs to be implemented in combination with its respective predetermined voltage VB1; Accordingly, the transistor 310 is allowed to switch on as soon as a negative pulse of the SOG signal arrives, whereas the transistor 310 is switched off as a non-negative voltage level of the SOG signal arrives. The DC voltage level measured at the node A is finally settled after the balance of charging and discharging among the transistor 110, the capacitor 140 and the resistor 120. The structure and operations of the resistor 120, the analog multiplexer 330 and the comparator 130 have been previously discussed and thus will not be described herein.

Figure 5:
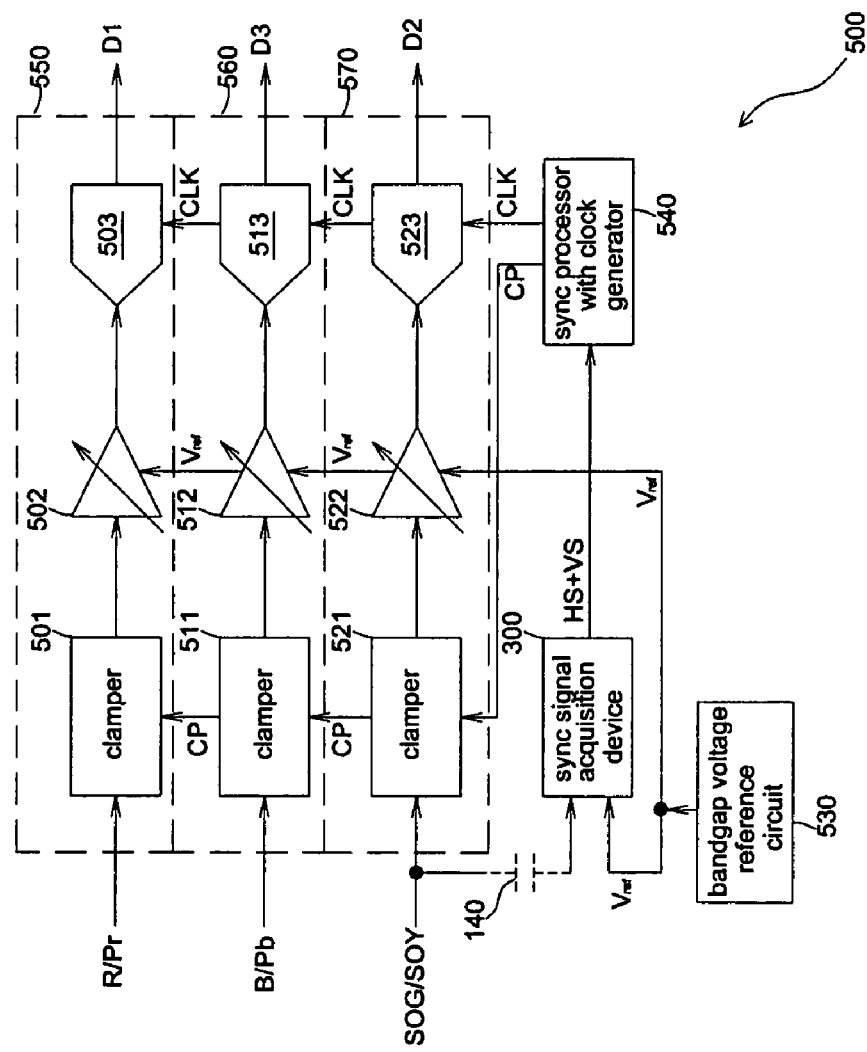
FIG. 5 is a block diagram illustrating an analog front end device of the invention.

FIG. 5 is a block diagram illustrating an analog front end device of the invention. According to the invention, an analog front end device (AFE) 500 employs the sync signal acquisition device 300 to produce a greater effect than that achieved by a conventional AFE device. The AFE device 500 is configured to receive an analog image signal containing sync pulses SOG/SOY and two analog image signals without embedded sync pulses R, B/Pr, Pb and generate three digital signals D1, D2, D3. The AFE device 500 comprises a bandgap voltage reference circuit 530, a sync processor with clock generator 540, three identical converting circuits 550, 560, 570 and a sync signal acquisition device 300. The bandgap voltage reference circuit 530 is employed to provide a reference voltage $V_{ref}$ while the sync signal acquisition device 300 is employed to receive the analog image signal containing sync pulses SOG/SOY and generate the composite sync signal HS+VS. The structure and operations of the sync signal acquisition device 300 have been mentioned above and therefore will not be described herein. After receiving the composite sync signal HS+VS, the sync processor with clock generator 540 generates a periodic clock signal CLK and a clamping signal CP. As to the three converting circuits 550, 560 and 570, each converting circuit comprises a clamper (501, 511, 521), an input buffer (502, 512, 522) and an ADC (503, 513, 523). Take an AFE device in a LCD controller for example. Three converting circuits 550, 560 and 570 respectively receive three analog image signals R, SOG (=G+HS+VS), B and then generates three digital signals D1, D2, D3. In addition, take an AFE device in a video decoder for example. Three converting circuits 550, 560 and 570 respectively receive three analog image signals Pr, SOY (=Y+HS+VS), Pb and then generates three digital signals D1, D2, D3. The clamper (501, 511, 521) receives an analog image signal and then reconstructs the DC voltage level of the analog image signal to generate a reconstructed signal. The input buffer (502, 512, 522) buffers the reconstructed signal according to reference voltage $V_{ref}$. The ADC (503, 513, 523) converts the output signal of the input buffer (502, 512, 522) into a digital signal in response to the clock signal CLK.

Figure 6:
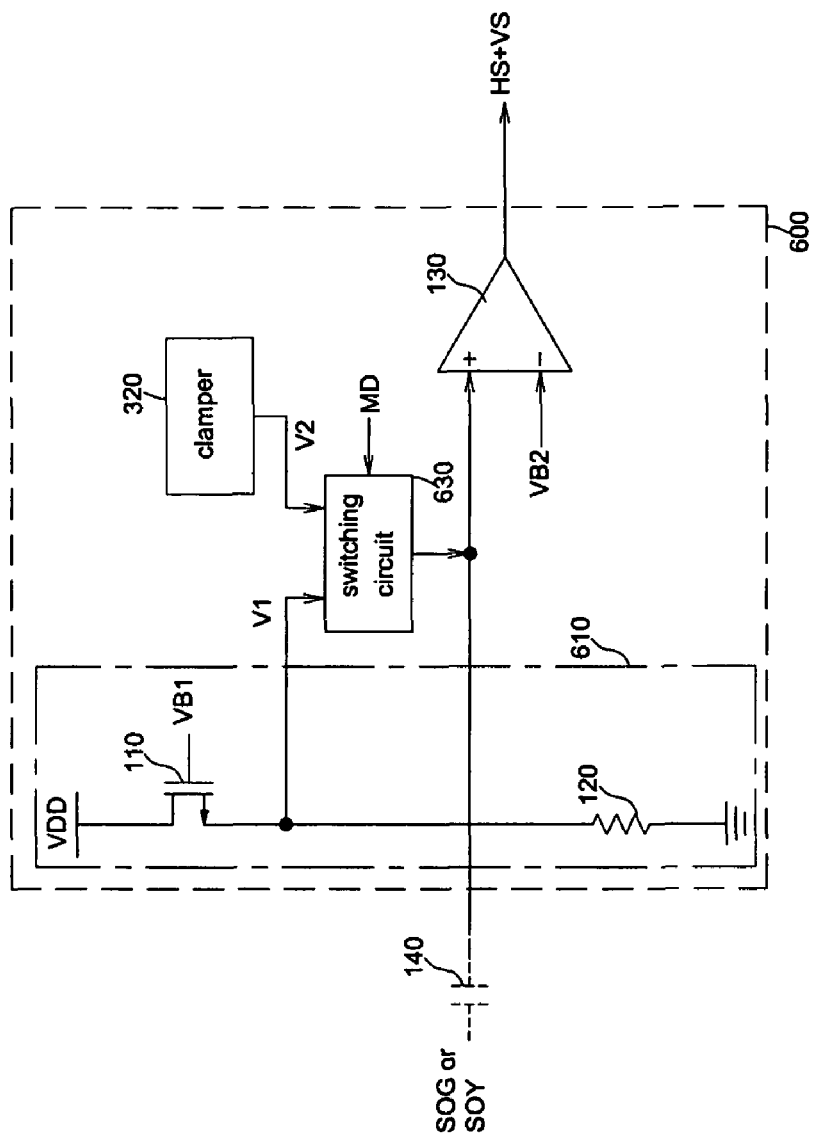
FIG. 6 is a block diagram illustrating a sync signal generating circuit of the invention.

FIG. 6 is a block diagram illustrating a sync signal generating circuit of the invention. According to the invention, a sync signal generating circuit 600 receives an analog image signal containing sync pulses (e.g., a SOG signal or a SOY signal) and generates a sync signal HS+VS. The sync signal generating circuit 600 comprises two clampers 320, 610, a switching circuit 630 and a comparator 130. The clamper 320 is used to provide a DC voltage level V1, whereas the clamper 610 is used to provide a DC voltage level V2. The switching circuit 630, which is coupled to two clampers 320, 610 respectively, outputs either the DC voltage level V1 or the DC voltage level V2 in response to a mode selecting signal MD. The comparator 130 compares the output voltage of the switching circuit 630 with a comparing voltage VB2 to generate a sync signal HS+VS. Wherein, the clamper 610 is implemented by a transistor 110 in series with a resistor 120. The transistor 110 is coupled among an operating voltage VDD, the predetermined voltage VB1 and the switching circuit 630 while the resistor 120 is coupled between the transistor 110 and ground.

As to general display system controllers, the thermal drift is most obvious in both a LCD controller with SOG circuit and a video decoder with SOY circuit. As the thermal drift in the SOG circuit or the SOY circuit occurs, its DC voltage level moves vertically to cause the HS signal to vary. This may even result in a shifted optimum sampling phase or an unstable or fluctuating image. By contrast, when applied to the LCD controller with SOG circuit or the video decoder with SOY circuit, the invention has the most remarkable improving effect, therefore solving or avoiding the thermal drift due to process changes or temperature changes.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A sync signal acquisition device for generating a composite sync signal according to an analog image signal containing sync pulses, comprising:
   a transistor having a terminal coupled to a predetermined voltage and another terminal designated as a first input node;
   a resistor having one terminal coupled to the first input node and another terminal coupled to a fixed voltage;
   a clamper having an output terminal designated as a second input node;
   an analog multiplexer for receiving voltages of the first input node and the second input node and outputting one of them via an output terminal of the analog multiplexer according to a mode selecting signal; and
   a comparator for comparing the output voltage of the output terminal of the analog multiplexer with a comparing voltage to generate the composite sync signal;
   wherein the analog multiplexer outputs the voltage of the first input node at start-up.

2. The sync signal acquisition device according to claim 1, wherein the clamper has a switch, one terminal of which is coupled to a reconstructing voltage and the other terminal of which is designated as the second input node, and wherein an operation of the switch is controlled by a clamping signal.

3. The sync signal acquisition device according to claim 2, wherein the following two equations are satisfied:

$$(-300\ mV + VB3) < VB2 < VB3$$

$$VB3 \geq 300\ mV,$$

where VB2 denotes the comparing voltage and V3 denotes the reconstructing voltage.

4. The sync signal acquisition device according to claim 1, wherein the transistor is a PN diode with its anode (p-type side) coupled to the predetermined voltage and its cathode (n-type side) designated as the first input node.

5. The sync signal acquisition device according to claim 1, wherein the transistor is a NPN bipolar junction transistor, the collector of which is coupled to a power supply voltage, the base of which is coupled to the predetermined voltage and the emitter of which is designated as the first input node.

6. The sync signal acquisition device according to claim 1, wherein the transistor is a NMOS transistor, the drain of which is coupled to a power supply voltage, the gate of which is coupled to the predetermined voltage and the emitter of which is designated as the first input node.

7. The sync signal acquisition device according to claim 1, wherein the analog image signal containing sync pulses is a Sync_on_Green (SOG) signal.

8. The sync signal acquisition device according to claim 1, wherein the analog image signal containing sync pulses is a Sync_on_Luma (SOY) signal.

9. The-sync signal acquisition device according to claim 1, further comprising a capacitor with its one terminal coupled to the output terminal of the analog multiplexer and its other terminal receiving the analog image signal containing sync pulses.

10. An analog front end (AFE) device for receiving three analog image signals, one of them containing sync pulses, the AFE device comprising:
   a reference voltage generator for generating a reference voltage;
   a sync signal acquisition device for generating a composite sync signal according to the analog image signal containing sync pulses, comprising:
      a transistor having a terminal coupled to a predetermined voltage and another terminal designated as a first input node;
      a resistor having one terminal coupled to the first input node and another terminal coupled to a fixed voltage;
      a first clamper having an output terminal designated as a second input node;
      an analog multiplexer, coupled to the first input node and the second input node, for outputting the voltage of either input node via an output terminal of the analog multiplexer according to a mode selecting signal; and
      a comparator for comparing the voltage of the output terminal of the analog multiplexer with a comparing voltage to generate the composite sync signal;
   a sync processor with clock generator for receiving the composite sync signal and generating a clock signal; and
   three converting circuits, each of which comprises:
      a second damper for receiving one of the analog image signal and generating a reconstructed signal;
      an input buffer for buffering the reconstructed signal according to the reference voltage; and
      an analog to digital converter responsive to the clock signal for converting an output signal of the input buffer into a digital signal;
   wherein the analog multiplexer outputs the voltage of the first input node at start-up.

11. The analog front end device according to claim 10, which is disposed in a liquid crystal display controller, wherein the analog image signal containing sync pulses is a SOG analog image signal and the two analog image signals are a red analog image signal and a blue analog image signal.

12. The analog front end device according to claim 10, which is disposed in a video decoder, wherein the analog image signal containing sync pulses is a SOY analog image signal and the two analog image signals are a Pr analog image signal and a Pb analog image signal.

13. The analog front end device according to claim 10, wherein the first clamper has a switch with its one terminal coupled to a reconstructing voltage and its other terminal designated as the second input node, and wherein the operation of the switch is controlled by a clamping signal.

14. The analog front end device according to claim 13, wherein the following two equations are satisfied:

$$(-300\ mV + VB3) < VB2 < VB3$$

$$VB3 \geq 300\ mV,$$

where VB2 denotes the comparing voltage and V3 denotes the reconstructing voltage.

15. The analog front end device according to claim 10, wherein the transistor is a PN diode with its anode (p-type side) coupled to the predetermined voltage and its cathode (n-type side) designated as the first input node.

16. The analog front end device according to claim 10, wherein the transistor is a NPN bipolar junction transistor, the collector of which is coupled to a power supply voltage, the base of which is coupled to the predetermined voltage and the emitter of which is designated as the first input node.

17. The analog front end device according to claim 10, wherein the transistor is a NMOS transistor, the drain of which is coupled to a power supply voltage, the gate of which is coupled to the predetermined voltage and the emitter of which is designated as the first input node.

18. The analog front end device according to claim 10, further comprising a capacitor with its one terminal coupled to the output terminal of the analog multiplexer and its other terminal receiving the analog image signal containing sync pulses.

19. A sync signal generating circuit, comprising:
   a first clamping circuit for providing a first DC voltage level;
   a second clamping circuit for providing a second DC voltage level;
   a switching circuit coupled to the first clamping circuit and the second clamping circuit for outputting either the first DC voltage level or the second DC voltage level in response to a control signal; and
   a comparator coupled to the switching circuit for receiving either the first DC voltage level or, the second DC voltage level and comparing an analog signal with a reference signal to generate a sync signal;
   wherein a DC voltage level of the analog signal is determined by either the first DC voltage level or the second DC voltage level;
   wherein the second DC voltage level is substantially fixed and the first DC voltage level varies according to at least one of a temperature and a process of the first clamping circuit; and
   wherein the switching circuit outputs the first DC voltage level at start-up.

20. The sync signal generating circuit according to claim 19, wherein a DC voltage level of the reference signal is less than the second DC voltage level.

21. The sync signal generating circuit according to claim 20, wherein the sync signal comprises at least one of a horizontal sync signal and a vertical sync signal.

22. The sync signal generating circuit according to claim 21, wherein the first clamping circuit comprises:
   a transistor coupled between a predetermined voltage and the switching circuit; and
   a resistor coupled between the transistor and a reference voltage.

23. The sync signal generating circuit according to claim 21, wherein the second clamping circuit comprises:

a switch coupled to a predetermined voltage, the switch determining whether to supply the predetermined voltage to the switching circuit according to a clamping signal.

24. The sync signal generating circuit according to claim 21, wherein the switching circuit is an analog multiplexer.

25. The sync signal generating circuit according to claim 21, which is embedded in an analog front end device.

26. The sync signal generating circuit according to claim 21, wherein the analog signal is an analog image signal.

27. A sync signal generating circuit, comprising:
a first clamping circuit for providing a first DC voltage level;
a second clamping circuit for providing a second DC voltage level;
a switching circuit coupled to the first clamping circuit and the second clamping circuit for outputting either the first DC voltage level or the second DC voltage level in response to a control signal; and
a comparator coupled to the switching circuit for receiving either the first DC voltage level or the second DC voltage level and comparing an analog signal with a reference signal to generate a sync signal;
wherein a DC voltage level of the analog signal is determined by either the first DC voltage level or the second DC voltage level; and
wherein the first clamping circuit comprises:
a transistor coupled between a predetermined voltage and the switching circuit; and
a resistor coupled between the transistor and a reference voltage.

* * * * *